United States Patent
Hosokawa et al.

(10) Patent No.: US 9,541,446 B2
(45) Date of Patent: Jan. 10, 2017

(54) OCCUPANT DETERMINATION APPARATUS USING LOAD SENSOR

(71) Applicants: DENSO CORPORATION, Kariya, Aichi-pref. (JP); Honda Motor Co., Ltd., Tokyo (JP)

(72) Inventors: Toshio Hosokawa, Anjo (JP); Yusuke Muramatsu, Wako (JP); Mikihito Kojima, Wako (JP)

(73) Assignees: DENSO CORPORATION, Kariya, Aichi-pref. (JP); Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 14/221,505

(22) Filed: Mar. 21, 2014

(65) Prior Publication Data

US 2014/0291041 A1 Oct. 2, 2014

(30) Foreign Application Priority Data

Mar. 29, 2013 (JP) .................................. 2013-071477

(51) Int. Cl.
G01G 19/414 (2006.01)

(52) U.S. Cl.
CPC ................................ *G01G 19/4142* (2013.01)

(58) Field of Classification Search
CPC .................... G01G 19/4142; B60R 21/01516; B60R 21/01556; B60R 21/0152; B60R 21/01532; B60N 2/002
See application file for complete search history.

(56) References Cited

U.S. PATENT DOCUMENTS

| 6,345,839 B1 | 2/2002 | Kuboki et al. |
| 6,494,284 B1 | 12/2002 | Cooper |
| 6,519,551 B1 * | 2/2003 | Reich ................ B60R 21/01516 701/45 |
| 6,957,591 B2 * | 10/2005 | Takafuji .............. G01G 19/4142 73/862.391 |

(Continued)

FOREIGN PATENT DOCUMENTS

| JP | 09-207638 | 8/1997 |
| JP | 2003-240628 | 8/2003 |
| JP | 2012162196 A | 8/2012 |

OTHER PUBLICATIONS

U.S. Appl. No. 14/221,484, filed Mar. 21, 2014, Hosokawa.

*Primary Examiner* — Natalie Huls
(74) *Attorney, Agent, or Firm* — Harness, Dickey & Pierce, P.L.C.

(57) ABSTRACT

An occupant determination apparatus includes a load sensor and a determination section. The load sensor detects a load of an occupant seated in a seat of a vehicle to provide the detected load as a load signal. The determination section determines presence or absence of the occupant and a physical size of the occupant by classifying the load signal into a subject class among a plurality of classes that are ordered from small to large according to the physical sizes based on predetermined threshold loads. The subject class is stored as a determined class. The determination section permits the determined class to transition from a present class to an immediately adjacent larger class when the load signal equal to or larger than a threshold load between the present class and the immediately adjacent larger class continues being received for a threshold time.

11 Claims, 7 Drawing Sheets

(56) References Cited

U.S. PATENT DOCUMENTS

| | | | |
|---|---|---|---|
| 7,009,502 B2* | 3/2006 | Breed | B60R 21/01516 280/735 |
| 7,120,526 B2* | 10/2006 | Takao | B60R 21/01516 180/273 |
| 7,131,513 B2* | 11/2006 | Mutou | B60N 2/002 180/273 |
| 7,165,785 B2 | 1/2007 | Bouladian | |
| 7,295,910 B2* | 11/2007 | Sakai | B60N 2/002 180/273 |
| 7,584,037 B2* | 9/2009 | Sakai | B60N 2/002 701/45 |
| 8,665,103 B2 | 3/2014 | Hayakawa et al. | |
| 2003/0154805 A1 | 8/2003 | Takafuji et al. | |
| 2005/0090958 A1* | 4/2005 | Hattori | B60N 2/002 701/45 |
| 2005/0131605 A1* | 6/2005 | Nakamoto | B60R 21/01516 701/45 |
| 2005/0216158 A1* | 9/2005 | Sakai | B60N 2/002 701/45 |
| 2007/0012502 A1 | 1/2007 | Molitor et al. | |
| 2007/0061102 A1* | 3/2007 | Kim | B60R 21/01516 702/173 |
| 2007/0176402 A1 | 8/2007 | Irie et al. | |
| 2007/0200721 A1 | 8/2007 | Stanley et al. | |
| 2009/0302580 A1 | 12/2009 | Kang et al. | |
| 2010/0152975 A1* | 6/2010 | Nakagawa | B60R 21/01532 701/45 |
| 2010/0207773 A1* | 8/2010 | Hayakawa | B60R 21/01532 340/667 |
| 2011/0010037 A1* | 1/2011 | Inayoshi | B60N 2/002 701/31.4 |
| 2011/0010038 A1* | 1/2011 | Inayoshi | B60N 2/002 701/31.4 |
| 2011/0010039 A1* | 1/2011 | Inayoshi | B60N 2/002 701/31.4 |
| 2014/0297132 A1* | 10/2014 | Hosokawa | B60R 21/0152 701/45 |
| 2014/0305713 A1* | 10/2014 | Hosokawa | B60R 21/0132 177/136 |

* cited by examiner

OCCUPANT DETERMINATION APPARATUS USING LOAD SENSOR

CROSS REFERENCE TO RELATED APPLICATION

The present application is based on Japanese Patent Application No. 2013-71477 filed on Mar. 29, 2013, the disclosure of which is incorporated herein by reference.

TECHNICAL FIELD

The present disclosure relates to an occupant determination apparatus in a vehicle for determining an occupant in the vehicle using a load sensor provided in an in-vehicle seat to suitably a control safety apparatus against collision such as an airbag.

BACKGROUND ART

[Patent Literature 1] JP 2003-240628 A (US 2003/0154805 A1)

In order to control inflation of an airbag, it is desirable to (i) recognize beforehand the physical size of an occupant, who is to be protected and (ii) control an inflation mode of the airbag. To that end, a load sensor has been built into a vehicle or a seat in the vehicle to provide an output voltage according to a load due to an occupant. The output voltage is then classified into one of classes (i.e., states) including a vacant seat class, a child class, an adult class, etc. based on predetermined threshold loads.

The output of a load sensor varies according to the change in occupant's posture or an acceleration G at travel motion. The resultant change in the output of the load sensor provide outputs of temporary incorrect determination when threshold values are fixed.

Patent Literature 1 discloses a technology to overcome such an issue, for example. The technology includes a load sensor to detect a load, which is applied to a seat in a vehicle; and a determination section to determine (i) presence or absence of an occupant and (ii) the physical size of the occupant by classifying the detected load into one of several classes using predetermined class threshold loads. When a detected load continuously remains in a subject class among a plurality of classes longer than a predetermined threshold time (duration), an inter-class transition into the subject class is determined to have arisen. Mutually different predetermined threshold times are prepared to at least some of the inter-class transitions.

Incidentally, in order to improve occupant protection, the number of classes of occupant physical sizes tends to increase to realize an airbag control that can respond to an individual occupant physical size. To that end, an occupant determination apparatus is also required to prepare multiple classes of occupant.

Patent Literature 1 discloses an example that classifies an occupant state into three classes of (i) a vacant seat class, (ii) a child class; and (iii) an adult class. One of the conditions of loads for such classification is as follows. For example, when the child class is in between the vacant seat class and the adult class, the child class is determined by whether a load W is detected in between a threshold load Wth2 for the vacant seat class and a threshold load Wth1 for the adult class.

SUMMARY

The present Inventor considered the following. Suppose a case of increasing the number of classes in Patent Literature 1 by dividing the adult class into a large adult class and a small adult class. Such a case causes the following issue. Some factor such an improper posture of an occupant being a large adult may involve an incorrect determination that mistakenly determines the large adult as being classified into the child class. The occupant then adjusts their posture more properly; this increases a detected load. Further, the detected load may vary as fluctuating up and down around a threshold load between the small adult class and the large adult class while farther crossing over a threshold load between the child class and the small adult class. Each time the detected load provides anew a value that does not satisfy the individual load condition, a counting timer may be reset. Regardless of the detected load providing minimally a value larger than that of the small adult class, the incorrect determination of classifying the large adult into the child class is maintained without being eventually classified into the small adult. This disables an appropriate airbag control. To prevent an incorrect determination, an inter-class transition may be determined according to an accumulated time period that is obtained by summing up a plurality of condition-satisfied times or durations; each condition-satisfied duration is a duration during which the detected load continues satisfying the loading condition of each class. However, such determination of the inter-class transition based on the accumulated time period tends to delay as compared with the case of using only each condition-satisfied duration.

It is an object of the present disclosure to provide an occupant determination apparatus to permit a proper airbag control to protect an occupant by certainly performing an inter-class transition, excluding determinations at the time when an occupant gets in a vehicle and at the time when an occupant gets off a vehicle. The inter-class transition can be minimally performed even when a detected load varies as fluctuating up and down around a different threshold value other than a threshold value between a present class and an adjacent class immediately adjacent to the present class.

To achieve the above object, according to an example of the present disclosure, an occupant determination apparatus is provided to include a load sensor and a determination section. The load sensor is to detect a load of an occupant who is seated in a seat of a vehicle to provide the detected load as a load signal. The determination section is to receive the load signal and determine (i) presence or absence of the occupant and (ii) a physical size of the occupant by classifying the load signal into a subject class among a plurality of classes, which are ordered from small to large according to the physical size, based on predetermined threshold loads, the subject class being stored as a determined class. The determination section performs an inter-class transition that permits the determined class to transition from a present class to an adjacent class that is immediately adjacent to the present class (i) when the load signal equal to or larger than a first threshold load, which is defined between the present class and the adjacent class that is larger than the present class, continues being received for a first threshold time, or (ii) when the load signal smaller than a second threshold load, which is defined between the present class and the adjacent class that is smaller than the present class, continues being received for a second threshold time.

That is, such a configuration permits the occupant determination apparatus operates as follows. When a load signal equal to or larger than a first threshold load between a present class and an adjacent large class that is large than and immediately adjacent to the present class is continuously received or provided for a first threshold time, the determined class is permitted to transition from the present class to the adjacent large class. Alternatively, when a load signal smaller than a second threshold load between a present class and an adjacent small class that is smaller than and immediately adjacent to the present class is continuously provided or received for a second threshold time, the determined class is permitted to transition from the present class to the adjacent small class. Therefore, even if a detected load varies and fluctuates up and down around a separate threshold value that is different from a threshold value defined between the present class and the adjacent class that is immediately adjacent to the present class, the inter-class transition from the present class into the adjacent class immediately adjacent to the present class can be made minimally. This can provide an advantageous effect to control an airbag to protect an occupant minimally.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

An embodiment according to the present disclosure will be explained with reference to drawings.

Figure 1:
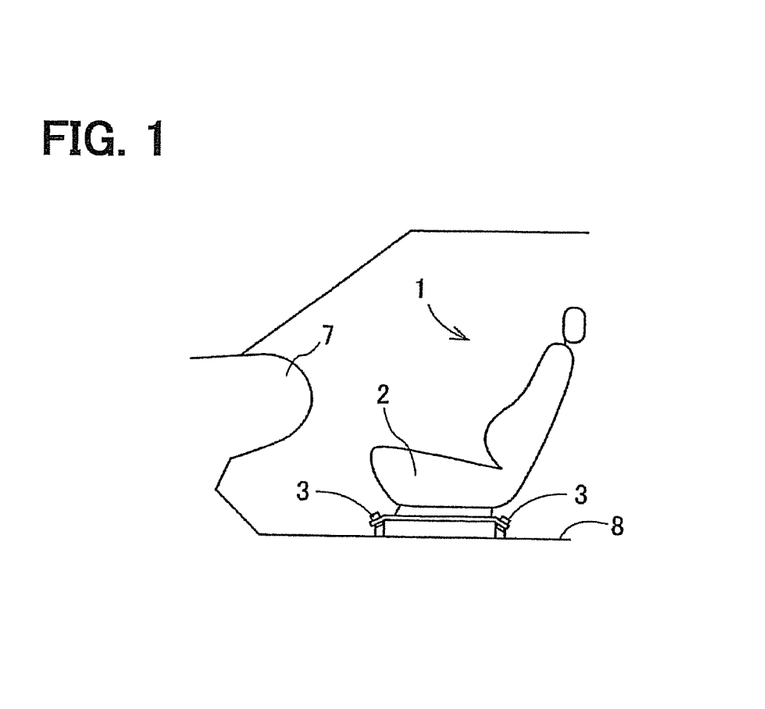
FIG. 1 is a schematic side-view diagram illustrating a seat, an airbag, and load sensors of an occupant determination apparatus according to an embodiment of the present disclosure.
Figure 2:
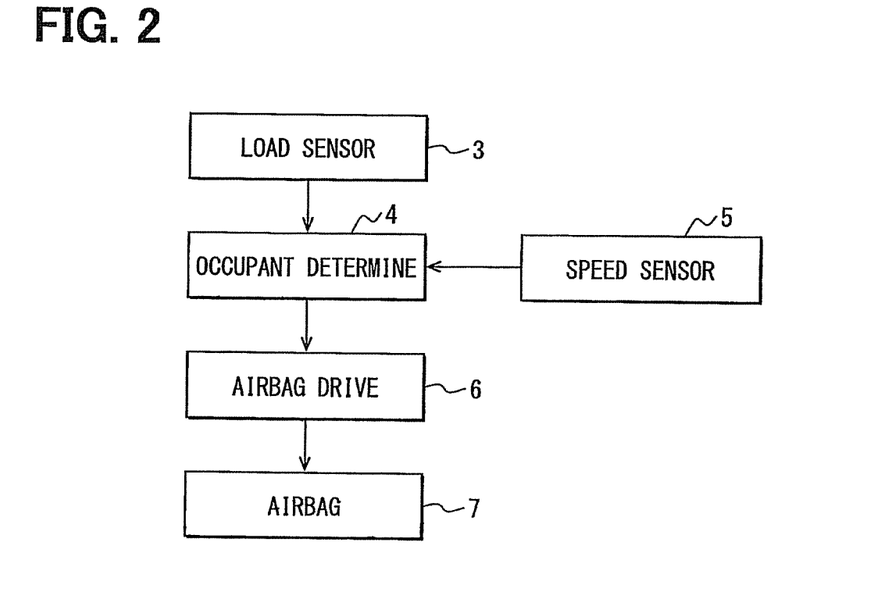
FIG. 2 is a block diagram schematically illustrating a configuration of the occupant determination apparatus.

With reference to FIGS. 1 and 2, an occupant determination apparatus according to an embodiment of the present disclosure includes a seat 1 of a vehicle; a plurality of load sensors 3; and an occupant determination unit 4. The plurality of load sensors 3 may be correctively referred to as a load sensor device 3. The load sensors 3 are disposed in a leg portion between a bottom of a seating portion 2 of the seat 1 and a vehicle-body floor 8; the load sensors 3 are to detect the weight of an occupant who is seated on the seating portion 2. The occupant determination unit 4 includes a microcomputer that performs arithmetic processing of load signals from the load sensors 3; the microcomputer comes with an A/D converter. The occupant determination unit 4 may be also referred to as a determination section.

Each load sensor 3 includes (i) a rubber layer and (ii) a pair of electrodes. The rubber layer is mixed with conductive particles to reduce an electric resistance value depending on compressive force. The pair of electrodes are provided to be stuck firmly to the respective opposite sides of the rubber layer such that the rubber layer is sandwiched in between two electrodes. When a human body (or physical solid) is seated on the seat 1, the electrical resistance in between the electrodes falls with the increase of the weight of the human body. In between the electrodes, a predetermined direct current voltage or a constant electric current is applied via a load resistance; this exhibits a voltage drop. The occupant determination unit 4 converts the resultant voltage drop into a digital signal using the A/D converter and reads the signal to thereby detect the weight of the occupant seated on the seat 1. It is noted that each load sensor 3 may be shaped of a sheet and embedded in an upper portion of the seating portion 2.

The load sensor 3 may be differently provided to be a load cell such as a strain gauge type, a semiconductor type, a magnetostriction type, and an electrostatic capacity type. Those types may be used suitably depending on each characteristic or cost. Here, any one of those types provides an analog output; this requires an A/D converter. In addition, in the present embodiment, the load sensor device is provided as being configured by four separate load sensors 3; however, the number of load sensors 3 constituting the load sensor device 3 may be changed to another number as needed.

The occupant determination unit 4 sums up the load signals of the plurality of the load sensors 3 to obtain a detected load W of the load sensor device 3. The detected load W is a digital signal into which the analog signals of the load sensors 3 are converted by the A/D converter of the occupant determination unit 4. It is noted that the detected load W may be a present value (i.e., instantaneous value) detected presently by the load sensors 3 or an average value, which is based on the detected values during the just previous short period of time while undergoing the removal of the high frequency noise components.

Figure 3:
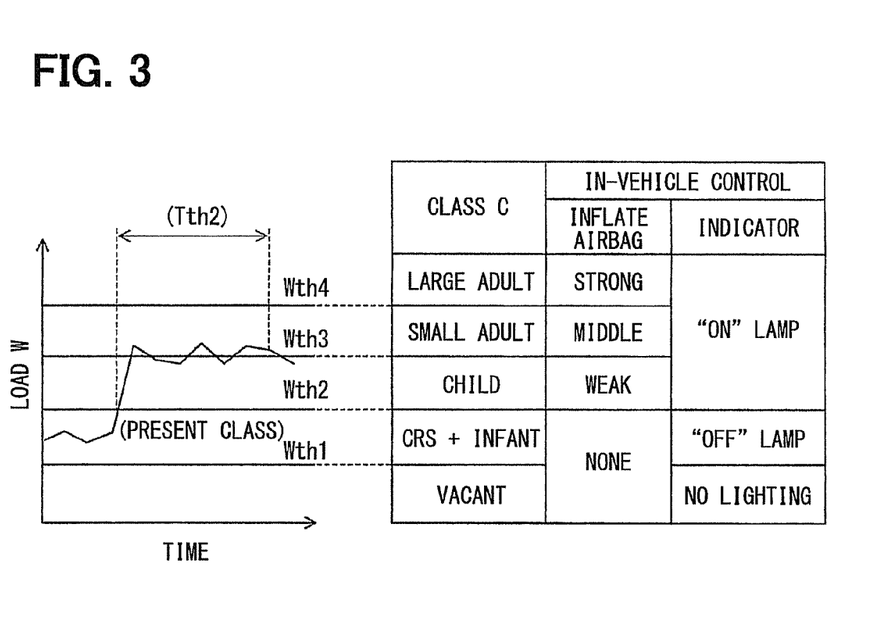
FIG. 3 is a diagram illustrating classes of occupant physical sizes and relevant in-vehicle control.

With reference to FIG. 3, threshold loads Wth1 to Wth4 are provided as becoming greater or ascending from small to large in value or load in the following order from Wth1, through Wth2 and Wth3, to Wth4. Based on threshold loads Wth1 to Wth4, the detected load W is classified into one (i.e., subject class) of five occupant classes, which are (i) a "vacant seat" class, (ii) a "CRS(Child Restraint System)+infant" class, (iii) a "child" class, (iv) a "small adult (adult having a small physical size)" class, and (v) a "large adult (adult having a large physical size)" class. The classifying-resultant subject class is stored as a determined class C in a storage portion of the occupant determination unit 4. The determined class C is transmitted as one of state signals to the airbag drive unit 6.

According to the received signal, the airbag drive unit 6 controls the airbag 7 to selectively perform one of four inflation states of (i) a none inflation state corresponding to both the "vacant seat" class and the "CRS(Child Restraint System)+infant" class, (ii) a weak inflation state corresponding to the "child" class, (iii) an intermediate (middle) inflation state corresponding to the "small adult" class, and (iv) a strong inflation state corresponding to the "large adult" class. Further, the "vacant seat" class and the "CRS+infant" class each may be referred to as a none-airbag-inflating class, which disables inflating the airbag 7 at a collision of the vehicle or is not a target class of inflating the airbag 7. In contrast, the "child" class, the "small adult", and the "large adult" class each are an airbag-inflating class, which enables inflating of the airbag 7 at a collision of the vehicle, or is a target class of inflating the airbag 7.

Furthermore, the airbag drive unit 6 controls a lamp state or a lighting state of an indicator depending on the inflation state performed in the airbag 7. It is noted that the number of the occupant classes may be changed as needed depending on vehicle types or vehicle grades. In addition, the airbag drive unit 6 may be provided as an integrated unit by further incorporating the function of the occupant determination unit 4.

Processes of determination/inter-class transition executed by the occupant determination unit 4 (i.e., microcomputer of the occupant determination unit 4) will be explained with reference to flowcharts in FIGS. 4 to 9. It is noted that an inter-class transition may be defined as a transition of the class C or determined class from a transition source class into a transition destination class. It is further noted that a flowchart in the present application includes sections (also referred to as steps), which are represented, for instance, as S1. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

Figure 4:
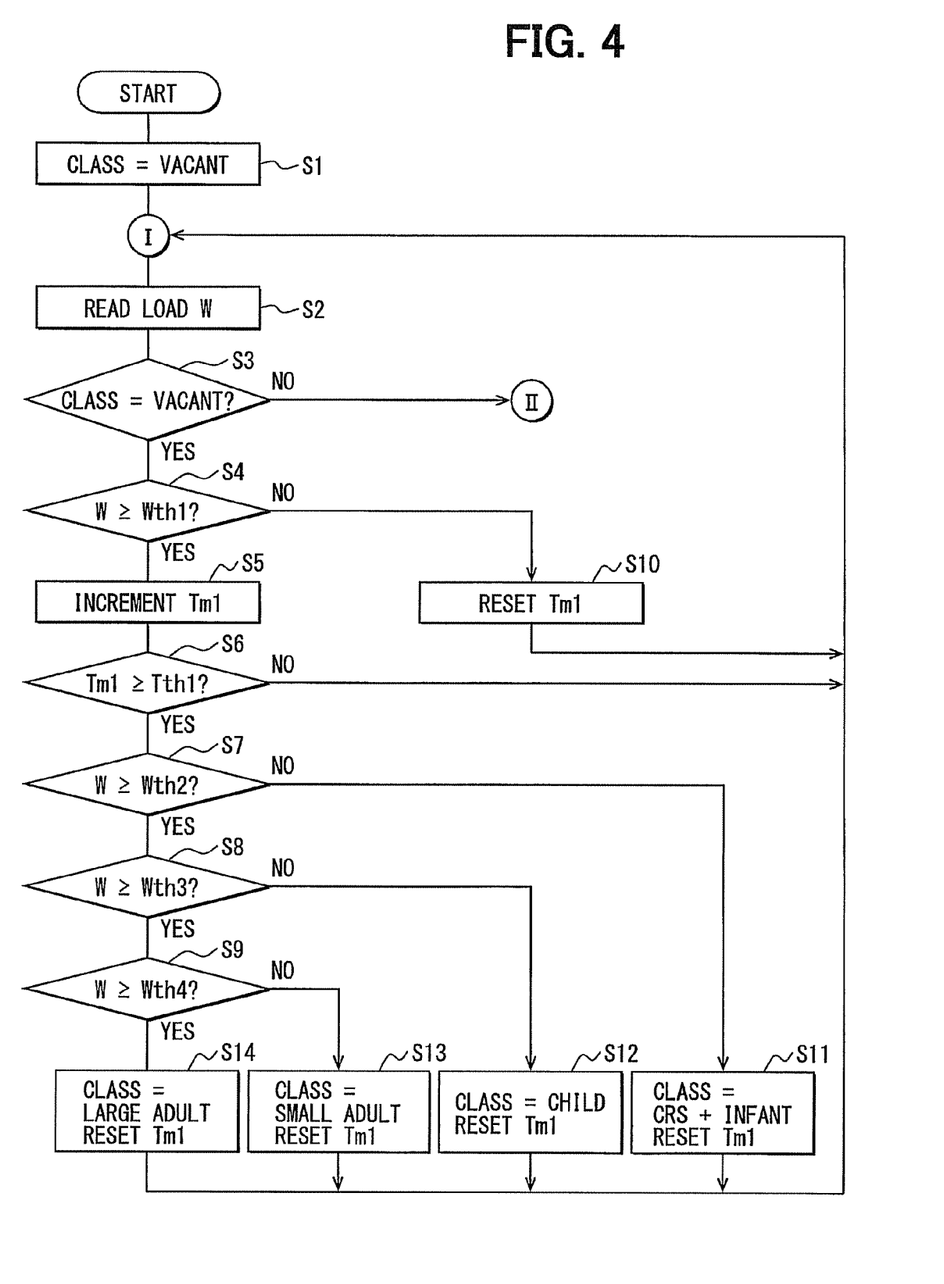
FIG. 4 is a flowchart diagram illustrating a class determination process when and after an occupant gets in a vehicle.

First, FIG. 4 is a flowchart diagram illustrating a class determination process when and after an occupant gets in a vehicle. At S1, timers Tm1 to Tm8 are reset while the determined class C is designated as the "vacant seat" class. At S2, the load signals of the load sensors 3 are read and converted to obtain a detected load W. At S3, it is determined whether the determined class C is the "vacant seat" class at present. When it is the "vacant seat" class, at S4 it is determined whether the load W is equal to larger than the threshold load Wth1. When the load W is equal to or larger than the threshold load Wth1, at S5 the timer Tm1 starts to increment a count. At S6, it is determined whether the count of the timer Tm1 reaches a threshold time Tth1. When it is determined at S4 that the load W is smaller than the threshold load Wth1, at S10 the timer Tm1 is reset; then, the processing returns to "I" to repeat the flow from S2.

When it is determined at S6 that the count of the timer Tm1 reaches the threshold time Tth1, at S7 it is determined whether the load W is equal to larger than the threshold load Wth2. In addition, when it is determined at S6 that the count of the timer Tm1 does not reach the threshold time Tth1, the processing returns to "I" to repeat the flow from S2.

When it is determined at S7 that the load W is equal to or larger than the threshold load Wth2, at S8 it is determined whether the load W is equal to larger than the threshold load Wth3. In addition, when it is determined at S7 that the load W is smaller than the threshold load Wth2, at S11 it is determined that the class C is anew the "CRS+infant" class and the timer Tm1 is reset.

When it is determined at S8 that the load W is equal to or larger than the threshold load Wth3, at S9 it is determined whether the load W is equal to larger than the threshold load Wth4. In addition, when the load W is smaller than the threshold load Wth3, at S12 it is determined that the class C is anew the "child" class and the timer Tm1 is reset.

When it is determined at S9 that the load W is smaller than the threshold load Wth4, at S13 it is determined the class C is anew the "small adult" class and the timer Tm1 is reset.

In addition, when the load W is equal to or larger than the threshold load Wth4, at S14 it is determined that the class C is anew the "large adult" class and the timer Tm1 is reset.

Thus, when an occupant gets in the vehicle and is seated on the seating portion 2, the detected load W is compared with the threshold loads Wth1, Wth2, Wth3, and Wth4. This achieves an initial determination of the class C to determine the class C to be one of four classes of (i) the "CRS+infant" class, (ii) the "child" class, (iii) the "small adult" class, and (iv) the "large adult" class.

Figure 5:
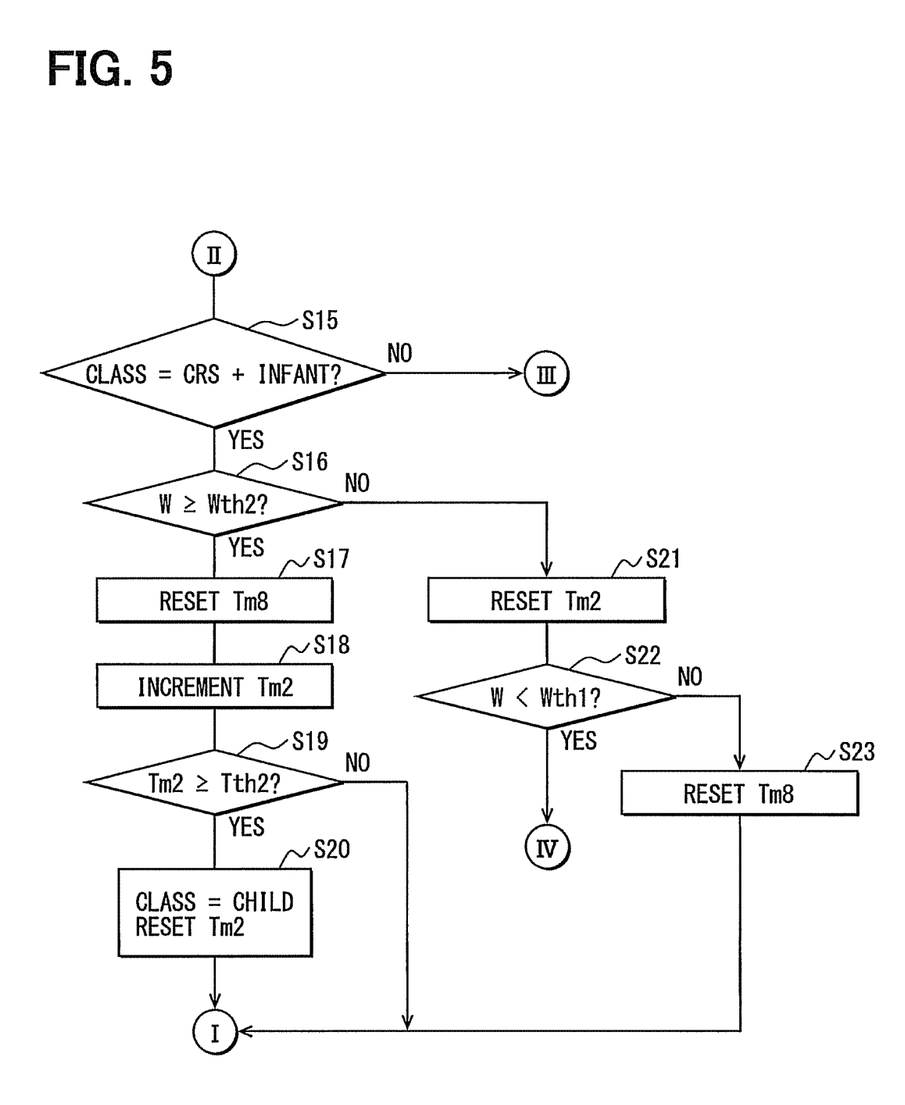
FIG. 5 is a flowchart diagram illustrating a process which performs an inter-class transition from a "CRS (child restraint system)+infant" class into a "child" class.

When it is determined at S3 that the present class C is not the "vacant seat" class, namely, when the present class C is one of the "CRS+infant" class, the "child" class, the "small adult" class, and the "large adult" class, the processing proceeds to "II" in FIG. 5. FIG. 5 is a flowchart diagram illustrating a process which performs an inter-class transition from the "CRS (child restraint system)+infant" class into the "child" class. At S15, it is determined whether the present determined class C is the "CRS+infant" class. When it is determined at S15 that the class C is the "CRS+infant" class, at S16 it is determined whether the load W is equal to larger than the threshold load Wth2. When the load W is equal to or larger than the threshold load Wth2, at S17 the timer Tm8 is reset, and at S18 the timer Tm2 starts to increment a count. At S19, it is determined whether the count of the timer Tm2 reaches a threshold time Tth2. When it is determined at S19 that the count of the timer Tm2 reaches the threshold time Tth2, at S20 the determined class C transitions into the "child" class and the timer Tm2 is reset. The processing then returns to "I" in FIG. 4. When it is determined at S19 that the count of the timer Tm2 does not reach the threshold time Tth2, the processing similarly returns to "I" in FIG. 4.

When it is determined at S16 that the load W is smaller than the threshold load Wth2, at S21 the timer Tm2 is reset. At S22, it is determined whether the load W is smaller than the threshold load Wth1. When the load W is smaller than the threshold load Wth1, the processing proceeds to "VI" in FIG. 9. When the load W is equal to or larger than the threshold load Wth1, at S23 the timer Tm8 is reset. The processing then proceeds to "I" in FIG. 4.

Figure 6:
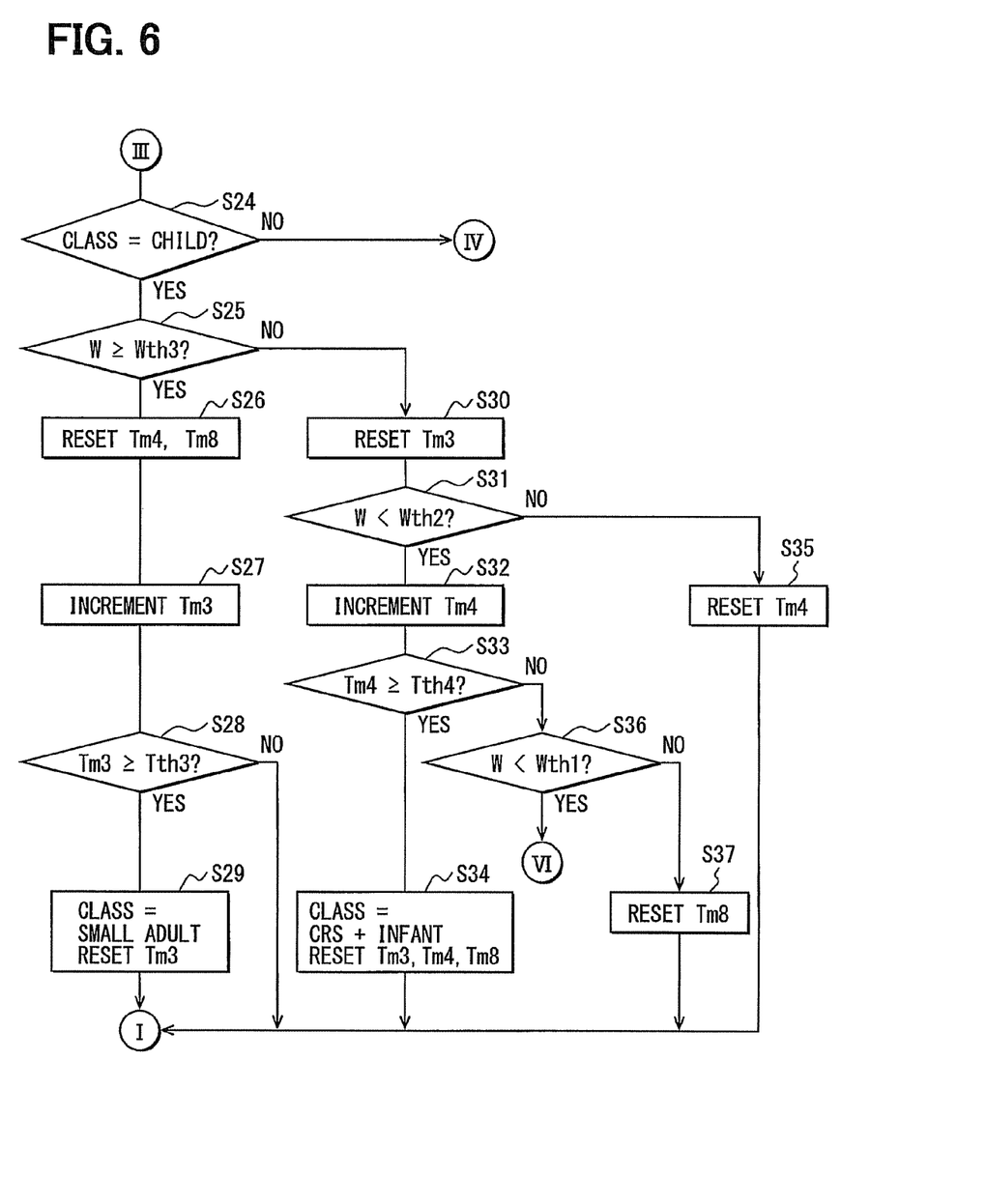
FIG. 6 is a flowchart diagram illustrating a process which performs an inter-class transition from a "child" class into a "small adult" class or a "CRS+infant" class.

When it is determined at S15 that the present class C is not the "CRS+infant" class, namely, when the class C is one of the "child" class, the "small adult" class, and the "large adult" class, the processing proceeds to "III" in FIG. 6. FIG. 6 is a flowchart diagram illustrating a process which performs an inter-class transition from the "child" class into the "small adult" class or the "CRS+infant" class. At S24 it is determined whether the present determined class C is the "child" class. When it is determined at S24 that the class C is the "child" class, at S25 it is determined whether the load W is equal to larger than the threshold load Wth3. When the load W is equal to or larger than the threshold load Wth3, at S26 the timer Tm4 and the timer Tm8 are reset. At S27, the timer Tm3 starts to increment a count. At S28, it is determined whether the count of the timer Tm3 reaches a threshold time Tth3. When it is determined at S28 that the count of the timer Tm3 reaches the threshold time Tth3, at S29 the determined class C transitions into the "small adult" class and the timer Tm3 is reset. The processing then returns to "I" in FIG. 4. When it is determined at S28 that the count of the timer Tm3 does not reach the threshold time Tth3, the processing similarly returns to "I" in FIG. 4.

When it is determined at S25 that the load W is smaller than the threshold load Wth3, at S30 the timer Tm3 is reset. At S31, it is determined whether the load W is smaller than the threshold load Wth2. When the load W is smaller than the threshold load Wth2, at S32 the timer Tm4 starts to increment a count. At S33, it is determined whether the count of the timer Tm4 reaches a threshold time Tth4. When it is determined at S33 that the count of the timer Tm4 reaches the threshold time Tth4, at S34 the determined class C transitions into the "CRS+infant" class and the timers Tm3, Tm4, and Tm8 are reset. The processing then proceeds to "I" in FIG. 4.

When it is determined at S31 that the load W is equal to or larger than the threshold load Wth2, at S35 the timer Tm4 is reset. The processing then proceeds to "I" in FIG. 4. When it is determined at S33 that the count of the timer Tm4 does not reach the threshold time Tth4, at S36 it is determined whether the load W is smaller than the threshold load Wth1. When the load W is smaller than the threshold load Wth1, the processing proceeds to "VI" in FIG. 9. When the load W is equal to or larger than the threshold load Wth1, at S37 the timer Tm8 is reset. The processing then proceeds to "I" in FIG. 4.

Figure 7:
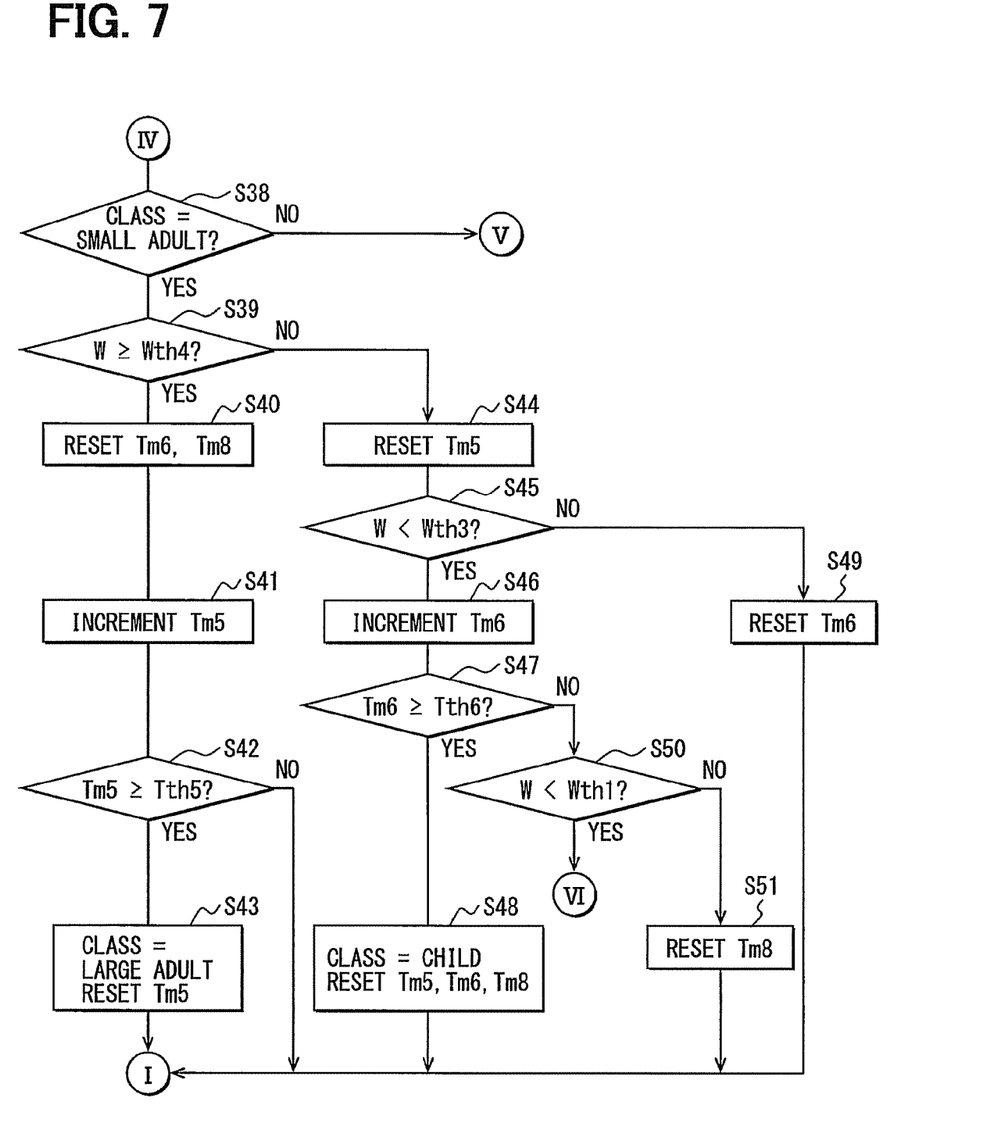
FIG. 7 is a flowchart diagram illustrating a process which performs an inter-class transition from a "small adult" class into a "large adult" class or a "child" class.

When it is determined at S24 that the present class C is not the "child" class, but the "small adult" class or the "large adult" class, the processing proceeds to "IV" in FIG. 7. FIG. 7 is a flowchart diagram illustrating a process which performs an inter-class transition from the "small adult" class into the "large adult" class or the "child" class. At S38, it is determined whether the present class C is the "small adult" class. When it is the "small adult" class, at S39 it is determined whether the load W is equal to larger than the threshold load Wth4. When the load W is equal to or larger than the threshold load Wth4, at S40 the timer Tm6 and the timer Tm8 are reset. At S41 the timer Tm5 starts to increment a count. At S42, it is determined whether the count of the timer Tm5 reaches a threshold time Tth5. When the count of the timer Tm5 reaches the threshold time Tth5, at S43 the determined class C transitions into the "large adult" class and the timer Tm5 is reset. The processing then returns to "I" in FIG. 4. When it is determined at S42 that the count of the timer Tm5 does not reach the threshold time Tth5, the processing similarly returns to "I" in FIG. 4.

When it is determined at S39 that the load W is smaller than the threshold load Wth4, at 544 the timer Tm5 is reset. At S45, it is determined whether the load W is smaller than the threshold load Wth3. When the load W is smaller than the threshold load Wth3, at S46 the timer Tm6 starts counting or increment. At S47, it is determined whether the count of the timer Tm6 reaches a threshold time Tth6. When the count of the timer Tm6 reaches the threshold time Tth6, at S48 the determined class C transitions into the "child" class and the timers Tm5, Tm6, and Tm8 are reset. The processing proceeds to "I" in FIG. 4.

When it is determined at S45 that the load W is equal to or larger than the threshold load Wth3, at S49 the timer Tm6 is reset. The processing then proceeds to "I" in FIG. 4. When it is determined at S47 that the count of the timer Tm6 does not reach the threshold time Tth6, at S50 it is determined whether the load W is smaller than the threshold load Wth1. When the load W is smaller than the threshold load Wth1, the processing proceeds to "VI" in FIG. 9. When the load W is equal to or larger than the threshold load Wth1, at S51 the timer Tm8 is reset. The processing then proceeds to "I" in FIG. 4.

Figure 8:
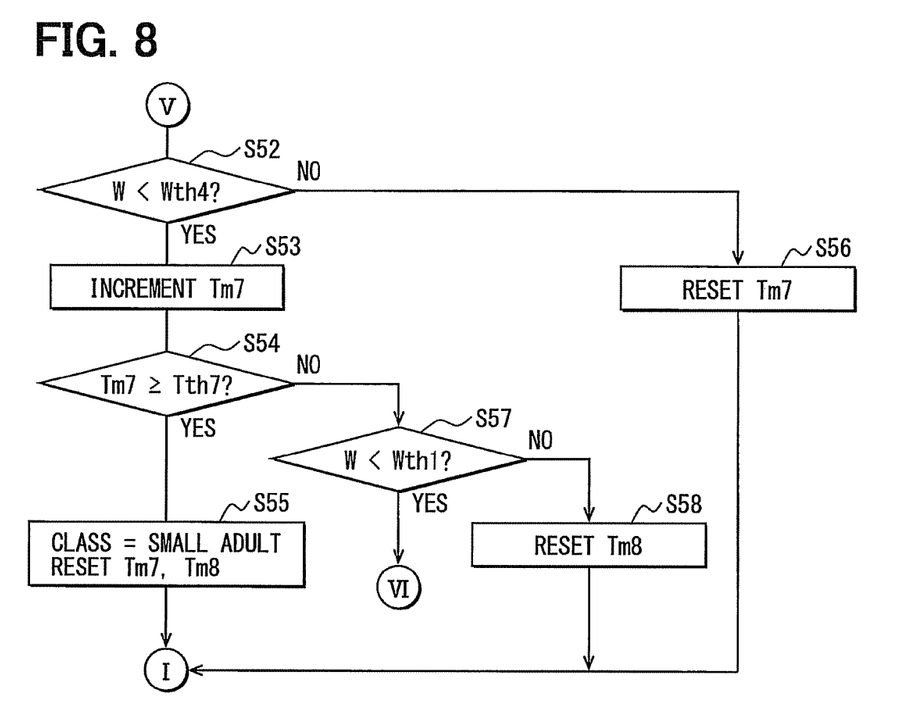
FIG. 8 is a flowchart diagram illustrating a process which performs an inter-class transition from a "large adult" class into a "small adult" class.

When it is determined at S38 that the class C is not the "small adult" class, but the "large adult" class, the processing proceeds to "V" in FIG. 8. FIG. 8 is a flowchart diagram illustrating a process which performs an inter-class transition from the "large adult" class into the "small adult" class. At S52, it is determined whether the load W is smaller than the threshold load Wth4. When the load W is smaller than the threshold load Wth4, at S53 the timer Tm7 starts to increment a count. At S54, it is determined whether the count of the timer Tm7 reaches a threshold time Tth7. When the count of the timer Tm7 reaches the threshold time Tth7, at S55 the determined class C transitions into the "small adult" class and the timers Tm7 and Tm8 are reset. The processing proceeds to "I" in FIG. 4. When it is determined at S52 that the load W is equal to or larger than the threshold load Wth4, at S56 the timer Tm7 is reset. The processing then proceeds to "I" in FIG. 4. When it is determined at S54 that the count of the timer Tm7 does not reach the threshold time Tth7, at S57 it is determined whether the load W is smaller than the threshold load Wth1. When the load W is smaller than the threshold load Wth1, the processing proceeds to "VI" in FIG. 9. When the load W is equal to or larger than the threshold load Wth1, at S58 the timer Tm8 is reset. The processing then proceeds to "I" in FIG. 4.

Figure 9:
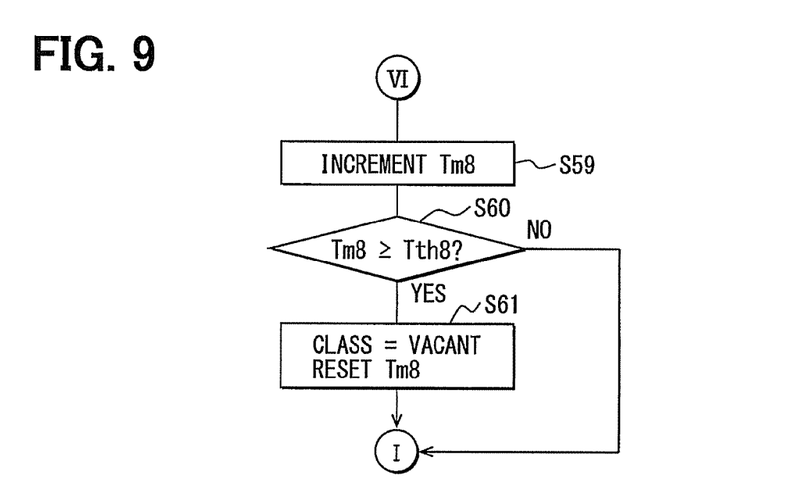
FIG. 9 is a flowchart diagram illustrating a class determination process when and after an occupant gets off a vehicle.

FIG. 9 is a flowchart diagram illustrating a class determination process when and after the occupant gets off the vehicle. Reference to "VI" in FIG. 9 that is called for from "VI" in FIGS. 5 to 8, at S59 the timer Tm8 starts to increment a count. At S60, it is determined whether the count of the timer Tm8 reaches a threshold time Tth8. When the count of the timer Tm8 reaches the threshold time Tth8, S61 is processed as follows. That is, (i) the determined class C transitions into the "vacant seat" class; (ii) it is determined that the present state is a state where the occupant leaves or gets off the vehicle; and (iii) the timer Tm8 is reset. The processing then proceeds to "I" in FIG. 4. When it is determined at S60 that the count of the timer Tm8 does not reach the threshold time Tth8, the processing similarly proceeds to "I" in FIG. 4.

In the above-mentioned explanation, the threshold time Tth1 corresponds to the timer Tm1 used for initial determining of the class C from the "vacant seat" class into one of four classes of the "CRS+infant" class, the "child" class, the "small adult," and the "large adult" class. Thus, in order to perform seated occupant classification or determination quickly when an occupant gets in the vehicle, the threshold time Tth1 is designated as a time such as three (3) seconds comparatively shorter than other threshold times for inter-class transitions.

The threshold time Tth2 corresponds to the timer Tm2 used for inter-class transition of the class C from the "CRS+infant" class into the "child" class. In order to require the reliability on inter-class transition or the stability of determination, the threshold time Tth2 is designated as a time such as 20 to 30 seconds comparatively longer than the threshold time Tth1 for the initial determination of the class C when an occupant gets in the vehicle.

The threshold time Tth3 corresponds to the timer Tm3 used for inter-class transition of the class C from the "child" class into the "small adult" class. In order to require the reliability on inter-class transition or the stability of determination, the threshold time Tth3 is designated as a time such as 20 to 30 seconds comparatively longer than the threshold time Tth1 for the initial determination of the class C when an occupant gets in the vehicle.

The threshold time Tth4 corresponds to the timer Tm4 used for inter-class transition of the class C from the "child" class into the "CRS+infant" class. In order to require the reliability on inter-class transition or the stability of determination, the threshold time Tth4 is designated as a time such as 20 to 30 seconds comparatively longer than the threshold time Tth1 for the initial determination of the class C when an occupant gets in the vehicle.

The threshold time Tth5 corresponds to the timer Tm5 used for inter-class transition of the class C from the "small adult" class into the "large adult" class. In order to require the reliability on inter-class transition or the stability of determination, the threshold time Tth5 is designated as a time such as 20 to 30 seconds comparatively longer than the threshold time Tth1 for the initial determination of the class C when an occupant gets in the vehicle.

The threshold time Tth6 corresponds to the timer Tm6 used for inter-class transition of the class C from the "small adult" class into the "child" class. In order to require the reliability on inter-class transition or the stability of determination, the threshold time Tth6 is designated as a time such as 20 to 30 seconds comparatively longer than the threshold time Tth1 for the initial determination of the class C when an occupant gets in the vehicle.

The threshold time Tth7 corresponds to the timer Tm7 used for inter-class transitioning of the class C from the "large adult" class into the "small adult" class. In order to require the reliability on inter-class transition or the stability of determination, the threshold time Tth7 is designated as a time such as 20 to 30 seconds comparatively longer than the threshold time Tth1 for the initial determination of the class C when an occupant gets in the vehicle.

The threshold time Tth8 corresponds to the timer Tm8 used for determining of the class C from one of the "CRS+infant" class, the "child" class, the "small adult," and the "large adult" class into the "vacant seat" class. In order to once determine the "vacant seat" class quickly when an occupant gets off the vehicle and then perform initial determination of the class C from the "vacant seat" class, the threshold time Tth8 is designated as a time such as two (2) seconds comparatively shorter than other threshold times for inter-class transition.

As explained above, the occupant determination apparatus using a load sensor according to the present embodiment is provided as follows. First, the seated occupant classes include, in ascending order (or load-increasing order) of detected load W, from the smallest class through intermediate classes to the largest class, namely, from the "vacant seat" class; through the "CRS+infant" class, the "child" class, and the "small adult" class; to the "large adult" class. Now, a "vacant seat"-excluded inter-class transition may be defined as inter-class transitions excluding each of (i) the vehicle-getting-in determination that permits the determined class C to transition from the "vacant seat" class into another class when an occupant gets in the vehicle and (ii) the vehicle-getting-off determination that permits the determined class C to transition into the "vacant seat" class from another class when the occupant gets off the vehicle. Under the "vacant seat"-excluded inter-class transition, the determined class C is permitted to transition from a present class to an adjacent large class that is larger than and immediately adjacent to the present class when the detected load W equal to or larger than a first threshold load defined between the present class and the adjacent large class continues being provided for a first threshold time. In contrast, the determined class C is permitted to transition from the present class to an adjacent small class that is smaller than and immediately adjacent to the present class when the detected load W smaller than a second threshold load between the present class and the adjacent small class continues being provided for a second threshold time.

Suppose that the detected load W may range over a different separate threshold load that is other than (i) a large-side adjacent threshold load defined between a present class and an adjacent large class that is larger than and immediately adjacent to the present class and (ii) a small-side adjacent threshold load defined between a present class and an adjacent small class that is smaller than and immediately adjacent to the present class. Even in such a case that the detected load W ranges over the different separate threshold load, the inter-class transition from the present class into the immediately adjacent class is permitted to be performed with certainty and high reliability. This can provide an advantageous effect to control an airbag to protect an occupant minimally.

With reference to FIG. 3, a comparative example will be explained. For example, a subject child with a physical size close to that of a small adult (i.e., an adult having a small physical size) is seated on a front portion of a seat; and the class C is first determined to be the "CRS+infant" class. Then the subject child shifts their hip to be seated deeply on the seat; this increases the detected load W to not only cross over the threshold load Wth2 but also fluctuate up and down around the threshold load Wth3. In this case, when the condition of the detected load W for the inter-class transition from the "CRS+infant" class into the "child" class is specified to be "Wth2≤W<Wth3", i.e., equal to or larger than the threshold load Wth2 and smaller than the threshold load Wth3, the timer Tm2 needs to be reset each time the detected load W becomes equal to or larger than the threshold load Wth3. This disables even the inter-class transition from the "CRS+infant" class into the "child" class regardless of the load larger than the "child" class being continuously provided or inputted at least. In contrast, according to the present embodiment of the present disclosure, the condition of the detected load W for the inter-class transition from the "CRS+infant" class into the "child" class is specified to be "Wth2≤W", i.e., to be equal to or larger than the threshold load Wth2, alone, instead of being both (i) equal to or larger than the threshold load Wth2, and, simultaneously, (ii) smaller than the threshold load Wth3. Such a configuration or specification permits certainly the inter-class transition from the "CRS+infant" class into the "child" class while permitting an airbag control or an airbag inflating to be suitable for the child's physical size. Even when the above case may apply to a subject small adult having a physical size close to that of the "child" class, the determined class C certainly permits the inter-class transition from the "CRS+infant" class into the "child" class. This can provide a minimal airbag inflation at least. Further, for example, a subject large adult having a large physical size is seated on a front portion of a seat; and the class C is first determined to be the "CRS+infant" class. Then the subject large adult shifts their hip to be seated deeply on the seat; this increases and maintains the detected load W to be equal to or larger than the threshold load Wth4. In this case, the inter-class transition of the determined class C is permitted from the "CRS+infant" class, through the "child" class and the "small adult" class, into the "large adult" class. This can also provide a suitable airbag inflation.

As explained above, the present embodiment provides the load sensor device including four load sensors 3 that detect all the load applied to the seating portion 2. For instance, when the number of load sensors 3 is reduced to three, a load may incline to a none-sensor portion where no load sensor is provided. In such a case, the load inclining to the none-sensor portion cannot be detected; this reduces the load total of the load sensors as compared with the case where there is no inclination. Therefore, when the number of load sensors 3 is reduced, the change in the detected load increases as compared with the case of detecting all the load applied to the seating portion. This increases the repetition times of inter-class transitions. Thus, when the number of load sensors is reduced, the present embodiment can provide a more advantageous effect as compared with a conventional technology.

First Modification Example

The threshold times Tth2 to Tth7 are defined or used for inter-class transitions due to the change in the occupant's posture. Suppose that a basis class is assigned to the class determined at the initial determination using the threshold time Tth1. Further, an inter-class transition from a present determined class C into a next determined class C may be referred to as an inter-class transition from a transition source class into a transition destination class. As such a transition destination class becomes more distant or is farther from the basis class, the corresponding threshold time is designated to be longer. For example, suppose that the "CRS+infant" class is a basis class. The threshold time Tth3 for the inter-class transition from the "child" class into the "small adult" class is longer than the threshold time Tth2 for the inter-class transition from the "CRS+infant" class into the "child" class. The threshold time Tth5 for the inter-class transition from the "small adult" into the "large adult" class is longer than the threshold time Tth3 for the inter-class transition from the "child class" into the "small adult" class.

In other words, a plurality of threshold times are assigned to inter-class transitions that permit the determined class to transition from a present class serving as a transition source class into an immediately adjacent large class or an immediately adjacent small class serving as a transition destination class. Further, a basis class may be defined as a class that is initially determined as the determined class C when the occupant gets in the vehicle (i.e., at the initial determination when an occupant gets in a vehicle). As the transition destination class is farther from the basis class, the corresponding threshold time is designated to be longer. That is, the vehicle is in stopped state when the occupant gets in the vehicle; thus, any acceleration G due to travel motion of the vehicle is not applied to the occupant. Thus, the initial determination may be reliable. A threshold time may be provided to be lengthened as the transition destination class separates farther from the basis class of the initial determination; this makes it more difficult to transition into a class farther from the reliable basis class. In addition, the threshold times may be provided to be designated to make the inter-class transition into the basis class from other class easier. Thus, it is more difficult to mistakenly determine the class C due to the occupant's posture change or the acceleration G due to the travel motion of the vehicle. Even if an incorrect determination is made, transition into the reliable basis class can be made promptly. This can control an airbag effectively.

Second Modification Example

Similar to the first modification example, the threshold times Tth2 to Tth7 are used for inter-class transitions due to the change in the occupant's posture. Suppose that a basis class is assigned to the class determined when the speed signal from the speed sensor 5 of the vehicle inputted into the occupant determination unit 4 reaches a predetermined value or speed. Similarly, as a transition destination class becomes more distant or is farther from the basis class determined when the speed signal reaches the predetermined speed, the corresponding threshold time is designated to be longer.

In other words, a plurality of threshold times are assigned to inter-class transitions that permit the determined class to transition from a present class serving as a transition source class into an immediately adjacent large class or an immediately adjacent small class serving as a transition destination class. Further, a basis class may be defined as the determined class C that is determined when the speed signal from the speed sensor 5 of the vehicle inputted into the occupant determination unit 4 reaches a predetermined value or vehicle speed. As the transition destination class is farther from the basis class, the corresponding threshold time is designated to be longer. As explained above, the initial determination made when the occupant gets in the vehicle provides a high reliability, but may be subjected to the state where the occupant is seated in a front part of the seating portion of the seat while a vehicle door is still open. In contrast, while the vehicle travels at a predetermined speed, the occupant may not be seated in a front part of the seating portion of the seat. Thus, the determination made when the vehicle travels at the predetermined speed can provide a higher reliability. Therefore, the determined class C made when the vehicle travels at the predetermined speed may be defined as a basis class, and the threshold times (i.e., durations) may be designated to cause the inter-class transition into a class farther from the basis class to be more difficult. In addition, the threshold times may be designated to make the inter-class transition into the basis class from another class easier. Thus, it is more difficult to mistakenly determine the class C due to the occupant's posture change or the acceleration G due to the travel motion of the vehicle. Even if an incorrect determination is made, transition into the reliable basis class can be made promptly. This can control an airbag effectively.

Third Modification Example

In the inter-class transition due to the change in the occupant's posture, the designation for threshold times may be differently made as follows. With reference to FIG. 3, the "CRS+infant" class may be referred to as a none-airbag-inflating class that is not a target class of inflating the airbag 7. In contrast, the "child" class, the "small adult", and the "large adult" class each are an airbag-inflating class that is a target class of inflating the airbag 7. The threshold times Tth2 and Tth4 for inter-class transition to range over the threshold load Wth2 in between (i) the "child" class belonging to the airbag-inflating class and (ii) the "CRS+infant" class belonging to the none-airbag-inflating class are designated to be shorter than the threshold times Tth3, Tth5, Tth6, and Tth7 for inter-class transition between the "child" class, the "small adult" class, and the "large adult" class, each of which belongs to the airbag-inflating class.

In other words, the threshold times Tth2 and Tth4 correspond to inter-class transition to cross over the threshold load Wth2 defined between (i) the airbag-inflating class that is designed to enable inflating of an airbag at a collision of the vehicle and (ii) the none-airbag-inflating class that is designed to disable inflating of an airbag at a collision of the vehicle. In contrast, the threshold times Tth3, Tth5, Tth6, and Tth7 correspond to inter-class transition defined between the airbag-inflating classes that are designed to enable inflating of an airbag. Herein, the threshold times Tth2 and Tth4 are designated to be shorter than the threshold times Tth3, Tth5, Tth6, and Tth7. This permits a quick inter-class transition from the airbag-inflating class into the none-airbag-inflating class or from the none-airbag-inflating class into the airbag-inflating class, as compared with the inter-class transition between the airbag-inflating classes. This can control an airbag effectively at a collision of the vehicle.

Fourth Modification Example

In the inter-class transitioning due to the change in the occupant's posture, the designation for threshold times may be differently made as follows. Again, with reference to FIG. 3, the "CRS+infant" class may be referred to as a none-airbag-inflating class that is not a target class of inflating the airbag 7. In contrast, the "child" class, the "small adult", and the "large adult" class each are an airbag-inflating class that is a target class of inflating the airbag 7. The threshold time Tth4 for the inter-class transition from the "child" class belonging to the airbag-inflating class into the "CRS+infant" class belonging to the none-airbag-inflating class is designated to be longer than the threshold time Tth2 for the inter-class transition from the "CRS+infant" class belonging to the none-airbag-inflating class into the "child" class belonging to the airbag-inflating class. In contrast, the threshold times Tth3, Tth5, Tth6, Tth7 for the inter-class transitions between the "child" class, the "small adult" class, and "large adult" class, each of which belongs to the airbag-inflating class, are designated to be longer than the threshold time Tth4 for the inter-class transition from the "child" class belonging to the airbag-inflating class into the "CRS+infant" class belonging to the none-airbag-inflating class.

In other words, the threshold time Tth4 corresponds to inter-class transition from the airbag-inflating class that is designed to enable inflating of an airbag into the none-airbag-inflating class that is designed to disable inflating of an airbag. The threshold time Tth2 corresponds to inter-class transition from the none-airbag-inflating class that is designed to disable inflating of an airbag into the airbag-inflating class that is designed to enable inflating of an airbag. The threshold times Tth3, Tth5, Tth6, and Tth7 correspond to inter-class transition in between the airbag-inflating classes that are designed to enable inflating of an airbag. Herein, the threshold times Tth3, Tth5, Tth6, and Tth7 are designated to be longer than the threshold time Tth4, whereas the threshold time Tth4 is designated to be longer than the threshold time Tth2. The load detected by a load sensor is typically smaller than a proper load since the proper load decreases due to the acceleration due to the travel motion of the vehicle applied to the occupant or the occupant's posture change; it is a rare case that a detected load is larger than a proper load. To that end, it is designed to make the inter-class transition into the reliable class quickly and, simultaneously, to make the inter-class transition into the airbag-inflating class that needs an airbag inflation quickly. This can control an airbag effectively.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An occupant determination apparatus comprising:
a load sensor to detect a load of an occupant who is seated in a seat of a vehicle and provide the detected load as a load signal; and
a computer having a determination section to receive the load signal and determine (i) presence or absence of the occupant and (ii) a physical size of the occupant by classifying the load signal into a subject class among a plurality of classes, which are ordered from small to large according to the physical size, based on a plurality of threshold loads that are predetermined, the subject class being stored as a determined class,
wherein:
the determination section performs an inter-class transition that permits the determined class to transition from a present class to an adjacent class that is immediately adjacent to the present class (i) when the load signal, which is equal to or larger than a first threshold load, continues being received for a first threshold time regardless of whether the load signal varies and fluctuates up and down around a first separate threshold load, the first threshold load which is defined between the present class and the adjacent class that is larger than the present class, the first separate threshold load which is defined to be larger than the first threshold load among the plurality of threshold loads, or (ii) when the load signal, which is smaller than a second threshold load, continues being received for a second threshold time regardless of whether the load signal varies and fluctuates up and down around a second separate threshold load, the second threshold load which is defined between the present class and the adjacent class that is smaller than the present class, the second separate threshold load which is defined to be smaller than the second threshold load among the plurality of threshold loads.

2. The occupant determination apparatus according to claim 1, wherein:
a plurality of threshold times including the first threshold time and the second threshold time are assigned to inter-class transitions each that permit the determined class to transition from the present class to the adjacent class being referred to as a transition destination class;
a class, which is initially determined as the determined class when the occupant gets in the vehicle, is defined as a basis class among the plurality of classes; and
as the transition destination class is farther from the basis class, a threshold time corresponding to the inter-class transition into the transition destination class is designated to be longer.

3. The occupant determination apparatus according to claim 1, wherein:
a plurality of threshold times including the first threshold time and the second threshold time are assigned to inter-class transitions each that permit the determined class to transition from the present class to the adjacent class being referred to as a transition destination class;
a class, which is stored as the determined class when a vehicle speed signal from a speed sensor in the vehicle provided to the determination section reaches a predetermined value, is defined as a basis class among the plurality of classes; and
as the transition destination class is farther from the basis class, a threshold time corresponding to the inter-class transition into the transition destination class is designated to be longer.

4. The occupant determination apparatus according to claim 1, wherein:
- a plurality of threshold times including the first threshold time and the second threshold time are assigned to inter-class transitions each that permit the determined class to transition from the present class to the adjacent class being referred to as a transition destination class;
- the plurality of classes include (i) airbag-inflating classes that each enable inflating of an airbag and (ii) a none-airbag-inflating class that disables inflating of the airbag;
- the plurality of threshold times include (i) a third threshold time that is defined for the inter-class transition between the airbag-inflating classes and (ii) a fourth threshold time that is defined for the inter-class transition between the airbag-inflating class and the none-airbag-inflating class; and
- the third threshold time between the airbag-inflating classes is designated to be longer than the fourth threshold time between the airbag-inflating class and the none-airbag-inflating class.

5. The occupant determination apparatus according to claim 1, wherein:
- a plurality of threshold times including the first threshold time and the second threshold time are assigned to inter-class transitions each that permit the determined class to transition from the present class to the adjacent class being referred to as a transition destination class;
- the plurality of classes include airbag-inflating classes that each enable inflating of an airbag and a none-airbag-inflating class that disables inflating of the airbag;
- the plurality of threshold times include (i) a third threshold time that is defined for the inter-class transition between the airbag-inflating classes; (ii) a fourth threshold time that is defined for the inter-class transition from the airbag-inflating class into the none-airbag-inflating class; and (iii) a fifth threshold time that is defined for the inter-class transition from the none-airbag-inflating class into the airbag-inflating class; and
- the third threshold time between the airbag-inflating classes is designated to be longer than the fourth threshold time from the airbag-inflating class into the none-airbag-inflating class, whereas the fourth threshold time from the airbag-inflating class into the none-airbag-inflating class is designated to be longer than the fifth threshold time from the none-airbag-inflating class into the airbag-inflating class.

6. An occupant determination apparatus comprising:
- a load sensor to detect a load of an occupant who is seated in a seat of a vehicle and provide the detected load as a load signal; and
- a computer having a determination section to receive the load signal and determine (i) presence or absence of the occupant and (ii) a physical size of the occupant by classifying the load signal into a subject class among a plurality of classes, which are ordered from small to large according to the physical size, based on predetermined threshold loads, the subject class being stored as a determined class, wherein:
- the determination section performs an inter-class transition that permits the determined class to transition from a present class to an adjacent class that is immediately adjacent to the present class (i) when the load signal equal to or larger than a first threshold load, which is defined between the present class and the adjacent class that is larger than the present class, continues being received for a first threshold time, or (ii) when the load signal smaller than a second threshold load, which is defined between the present class and the adjacent class that is smaller than the present class, continues being received for a second threshold time, wherein:
- a plurality of threshold times including the first threshold time and the second threshold time are assigned to inter-class transitions each that permit the determined class to transition from the present class to the adjacent class being referred to as a transition destination class;
- the plurality of classes include airbag-inflating classes that each enable inflating of an airbag and a none-airbag-inflating class that disables inflating of the airbag;
- the plurality of threshold times include (i) a third threshold time that is defined for the inter-class transition between the airbag-inflating classes; (ii) a fourth threshold time that is defined for the inter-class transition from the airbag-inflating class into the none-airbag-inflating class; and (iii) a fifth threshold time that is defined for the inter-class transition from the none-airbag-inflating class into the airbag-inflating class; and
- the third threshold time between the airbag-inflating classes is designated to be longer than the fourth threshold time from the airbag-inflating class into the none-airbag-inflating class, whereas the fourth threshold time from the airbag-inflating class into the none-airbag-inflating class is designated to be longer than the fifth threshold time from the none-airbag-inflating class into the airbag-inflating class.

7. An occupant determination apparatus comprising:
- a load sensor to detect a load of an occupant who is seated in a seat of a vehicle and provide the detected load as a load signal; and
- an occupant-class determiner to receive the load signal and determine (i) presence or absence of the occupant and (ii) a physical size of the occupant by classifying the load signal into a subject class among a plurality of classes, which are ordered from small to large according to the physical size, based on a plurality of threshold loads that are predetermined, the subject class being stored as a determined class, wherein:
- the occupant-class determiner performs an inter-class transition that permits the determined class to transition from a present class to an adjacent class that is immediately adjacent to the present class
- (i) when the load signal, which is equal to or larger than a first threshold load, continues being received for a first threshold time regardless of whether the load signal varies and fluctuates up and down around a first separate threshold load,
  - the first threshold load which is defined between the present class and the adjacent class that is larger than the present class,
  - the first separate threshold load which is defined to be larger than the first threshold load among the plurality of threshold loads, or
- (ii) when the load signal, which is smaller than a second threshold load, continues being received for a second threshold time regardless of whether the load signal varies and fluctuates up and down around a second separate threshold load, the second threshold load which is defined between the present class and the adjacent class that is smaller than the present class, the second separate threshold load which is defined to be smaller than the second threshold load among the plurality of threshold loads.

8. The occupant determination apparatus according to claim 7, wherein:

a plurality of threshold times including the first threshold time and the second threshold time are assigned to inter-class transitions each that permit the determined class to transition from the present class to the adjacent class being referred to as a transition destination class;

a class, which is initially determined as the determined class when the occupant gets in the vehicle, is defined as a basis class among the plurality of classes; and as the transition destination class is farther from the basis class, a threshold time corresponding to the inter-class transition into the transition destination class is designated to be longer.

9. The occupant determination apparatus according to claim 7, wherein:

a plurality of threshold times including the first threshold time and the second threshold time are assigned to inter-class transitions each that permit the determined class to transition from the present class to the adjacent class being referred to as a transition destination class;

a class, which is stored as the determined class when a vehicle speed signal from a speed sensor in the vehicle provided to the occupant-class determiner reaches a predetermined value, is defined as a basis class among the plurality of classes; and as the transition destination class is farther from the basis class, a threshold time corresponding to the inter-class transition into the transition destination class is designated to be longer.

10. The occupant determination apparatus according to claim 7, wherein:

a plurality of threshold times including the first threshold time and the second threshold time are assigned to inter-class transitions each that permit the determined class to transition from the present class to the adjacent class being referred to as a transition destination class;

the plurality of classes include (i) airbag-inflating classes that each enable inflating of an airbag and (ii) a none-airbag-inflating class that disables inflating of the airbag;

the plurality of threshold times include (i) a third threshold time that is defined for the inter-class transition between the airbag-inflating classes and (ii) a fourth threshold time that is defined for the inter-class transition between the airbag-inflating class and the none-airbag-inflating class; and the third threshold time between the airbag-inflating classes is designated to be longer than the fourth threshold time between the airbag-inflating class and the none-airbag-inflating class.

11. The occupant determination apparatus according to claim 7, wherein:

a plurality of threshold times including the first threshold time and the second threshold time are assigned to inter-class transitions each that permit the determined class to transition from the present class to the adjacent class being referred to as a transition destination class;

the plurality of classes include airbag-inflating classes that each enable inflating of an airbag and a none-airbag-inflating class that disables inflating of the airbag;

the plurality of threshold times include (i) a third threshold time that is defined for the inter-class transition between the airbag-inflating classes; (ii) a fourth threshold time that is defined for the inter-class transition from the airbag-inflating class into the none-airbag-inflating class; and (iii) a fifth threshold time that is defined for the inter-class transition from the none-airbag-inflating class into the airbag-inflating class; and the third threshold time between the airbag-inflating classes is designated to be longer than the fourth threshold time from the airbag-inflating class into the none-airbag-inflating class, whereas the fourth threshold time from the airbag-inflating class into the none-airbag-inflating class is designated to be longer than the fifth threshold time from the none-airbag-inflating class into the airbag-inflating class.

\* \* \* \* \*